United States Patent
Coogan et al.

(10) Patent No.: US 7,272,452 B2
(45) Date of Patent: Sep. 18, 2007

(54) CONTROLLER WITH CONFIGURABLE CONNECTIONS BETWEEN DATA PROCESSING COMPONENTS

(75) Inventors: James J. Coogan, Des Plaines, IL (US); Virgil Seribo, Deerfield, IL (US)

(73) Assignee: Siemens VDO Automotive Corporation, Auburn Hills ( * ) Notice: Subject to any disclaimer, the term of this patent is extended or adjusted under 35 U.S.C. 154(b) by 279 days.

(21) Appl. No.: 11/038,778

(22) Filed: Jan. 19, 2005

(65) Prior Publication Data

US 2005/0222694 A1  Oct. 6, 2005

Related U.S. Application Data

(60) Provisional application No. 60/557,979, filed on Mar. 31, 2004.

(51) Int. Cl.
G05B 11/01 (2006.01)
G05B 13/00 (2006.01)

(52) U.S. Cl. .................................. 700/19; 700/276
(58) Field of Classification Search .................. 700/33, 700/42, 17, 19, 83, 103, 1–4, 6–12, 276–278, 700/299, 300; 236/1 R, 1 C
See application file for complete search history.

(56) References Cited

U.S. PATENT DOCUMENTS

| | | | |
|---|---|---|---|
| 4,721,448 A * | 1/1988 | Irish et al. .................. 425/144 |
| 5,024,265 A | 6/1991 | Buchholz et al. ............. 165/22 |
| 5,303,767 A | 4/1994 | Riley ........................... 165/12 |
| 5,318,104 A | 6/1994 | Shah et al. ................... 165/22 |
| 5,392,207 A * | 2/1995 | Wilson et al. ................ 700/64 |
| 5,819,845 A * | 10/1998 | Ryu et al. ................... 165/254 |
| 5,829,674 A | 11/1998 | Vanostrand et al. ....... 236/49.3 |
| 5,976,010 A | 11/1999 | Reese et al. ................ 454/229 |
| 6,006,142 A | 12/1999 | Seem et al. ................. 700/276 |
| 6,408,228 B1 | 6/2002 | Seem et al. ................. 700/276 |
| 6,488,081 B2 | 12/2002 | Rayburn et al. ............ 165/250 |
| 6,510,352 B1 * | 1/2003 | Badavas et al. ............. 700/19 |
| 6,549,826 B1 | 4/2003 | Pouchak et al. ........... 700/276 |
| 6,594,554 B1 | 7/2003 | Seem et al. ................. 700/276 |
| 6,654,750 B1 | 11/2003 | Adams et al. ............... 707/10 |
| 6,688,968 B2 | 2/2004 | Krafthefer .................. 454/333 |
| 6,711,471 B2 | 3/2004 | Kidder ...................... 700/276 |
| 2002/0151987 A1 * | 10/2002 | Mendez ......................... 700/8 |
| 2003/0064676 A1 | 4/2003 | Federspiel .................... 454/75 |
| 2003/0199244 A1 | 10/2003 | Siddaramanna et al. .... 454/256 |

* cited by examiner

Primary Examiner—Thomas K. Pham

(57) ABSTRACT

A controller with configurable connections between data processing components that is optimized to provide a particular function such as temperature control is provided. In one embodiment, the controller includes a number of configurable inputs and outputs that may be used with digital and/or analog signals. The controller includes a data processor with a plurality of data processing components including a first and a second loop control function. The inputs and outputs which are configurable to the loop control functions are defined as a set of allowed inputs and outputs for each of the loop control functions. The set of allowed inputs and outputs for the first loop control function is a subset of the set of allowed inputs and outputs for the second loop control function.

16 Claims, 10 Drawing Sheets

CONTROLLER WITH CONFIGURABLE CONNECTIONS BETWEEN DATA PROCESSING COMPONENTS

This application claims the benefit of and/or priority to U.S. provisional application Ser. No. 60/557,979, filed Mar. 31, 2004, and U.S. application Ser. No. 10/897,416 filed on Jul. 22, 2004, which in turn claims the benefit of U.S. provisional application Ser. No. 60/489,306 filed Jul. 22, 2003.

FIELD OF THE INVENTION

The present invention relates to distributed processing in automation control systems, and in particular, to automation control systems that use electronic controllers to control system or device operation.

BACKGROUND OF THE INVENTION

Automation control systems are well-known. Such systems include building automation systems for controlling environmental systems, elevator banks, and the like. Other automation control systems include industrial control, food processing, and transportation systems. These systems receive data from sensors that are evaluated to determine control actions to take in order to bring about some condition or perform some operation. For example, an environmental control system uses sensors to detect environmental conditions and system parameters throughout a building or other space that is environmentally regulated to determine control actions for maintaining or bringing the regulated space to some defined condition.

Generally, a system used to control the environmental conditions within a building is configured as a distributed network. That is, a single network is created that includes a network manager that is operably connected to a number of local controllers distributed throughout the network. The network manager manages and coordinates the operation of the local controllers by issuing control parameters and receiving data indicating the operating condition of the local controllers. The local controllers receive sensor input and control parameters and control the operation of components to effect the specific task that they are programmed to control.

The various components need not be provided from a single manufacturer in order to be incorporated into a network. For example, interoperability of components from various manufactures may be provided by following "standard" communications protocols that have evolved and which are used by a number of different manufacturers. By using devices with the same protocol, a consumer can be assured that the devices will be able to communicate with the other devices of the consumer's system once installed. One such protocol is the LonTalk protocol, also known as the ANSI/EIA 709-1 Control Networking Standard.

The LonTalk protocol is a layered, packet based, peer-to-peer communications protocol designed specifically for control systems. By using devices with a shared protocol, a consumer ensures that a device, regardless of its manufacturer, will be able to send and receive messages from other devices in the network. To this end, the protocol ideally enables communication without prior detailed knowledge of the topology of the network. Accordingly, systems using the LonTalk protocol maintain control functions within the various devices while sharing data with other devices in the system. Such a system may be referred to as an information-based control system. Accordingly, a device may be used in a variety of different applications.

Similarly, local controllers are used in a variety of applications. For example, a building including a number of laboratories may have dedicated local controllers for each laboratory. One laboratory may be used for chemical mixing. In such a case, it may be desired to maintain the laboratory at a pressure lower than surrounding areas so that any noxious fumes are extracted through the ventilation system and not allowed to seep into the surrounding areas. In contrast, a laboratory functioning as a clean room may require positive pressure in comparison to the surrounding areas so that only filtered air is introduced into the laboratory. The building may include a conference area that only needs to be environmentally controlled within a narrow temperature band if it is occupied, an atrium that must be constantly maintained within a narrow temperature band, and offices that must be maintained within a narrow temperature band only during normal work hours with the ability to maintain the narrow temperature band at all other times if the office is occupied.

In all of the above applications, and others not mentioned, the specific local controller must be able to receive input from the network that may include set points, dead bands, etc., as well as input from a variety of sensors. The sensors are temperature sensors, infrared body detectors, position indicators, water flow meters, air flow meters, water pressure meters, air pressure meters, and the like. Position indicators are devices that generate a signal that corresponds to the position of a switch, valve, or vent opening so the system controller may determine whether particular lights, fans, vents, or blower motors are operating or open. The data that are generated by the sensors may be provided in digital or analog form. Moreover, the signal may merely indicate one of two conditions, such as a position of open or shut, or it may further indicate a condition between two extremes, such as the extent to which the valve is open.

A similar situation arises with the output that is used to control the various components. A controller may be used to control lights, motors, valve position, and motor operation. All of these components may use a variety of control signals.

Accordingly, it is known in the prior art to provide controllers that are configurable to accept a number of different inputs and outputs. Typically, a set of terminals are connected to a particular processing component within the controller. When installing a controller, an installer selects the appropriate terminal based upon the specific sensors and components, and connects the local controller. Thus, the local controller is configurable to accept a variety of inputs and to provide a variety of outputs.

The ability to configure the input and output terminals allows a single type of local controller to be used with a variety of sensors and components and greatly increases the flexibility of the local controller. However, such local controllers are not necessarily useful in all of the different applications in which local controllers are used. This is because the various applications in which a local controller is used require a controller with different data processing modules. One approach to providing different data processing modules is to provide a controller that is pre-programmed with data processing modules that are directed to a specific application. Thus, when installing a controller in a system, the field technician need only attach wires to the proper input/output terminal. Such pre-programmed controllers are easy to install. However, each application requires a different controller. Therefore, a large inventory of controllers must be maintained, or installation may be delayed until an appropriate controller is ordered and received. Moreover, if the use of a room is changed and requires different functionality, a new controller must be obtained.

Another approach is to use field programmable controllers. This type of controller addresses some of the shortcomings of the pre-programmed controllers as they may be used in a wide variety of applications. Once installed, the data processing modules of the controller are programmed for the particular application. Thus, a single controller may be used in a variety of applications. Moreover, if the use of an area changes and requires a different functionality, the controller need not be replaced. In addition to possibly altering inputs and outputs, the controller only needs to be reprogrammed to realize the different functionality. Of course, the need to program the controllers increases the complexity of the installation process.

What is needed is a controller that includes configurable data processing modules such that the controller could be used for a number of different applications. It would be beneficial if the controller could be optimized for particular functionalities. It would be beneficial if the controller did not require complete programming of data processing modules at the time of installation. It would be further beneficial if the controller included configurable input and output modules.

SUMMARY OF THE INVENTION

A controller made in accordance with the principles of the present invention overcomes limitations previously encountered with local controllers. A local controller of the present invention includes the capability of configuring data processing modules that have been pre-programmed into the local controller. In one embodiment, a user interface is provided that allows the user to configure the input(s) to the controller to be provided to one of a plurality of data processing components. The output of the data processing components may also be configured as an input to another of the data processing components or as a controller output.

The data processing modules within the controller may comprise a plurality of proportional-integral-derivative (PID) modules, a data mapping module, and/or a statistic function module. The controller may further comprise a motor module. The allowed logical connections for each of the data processing modules are defined within a set of allowed configurations. In one embodiment, the allowed logical connections are defined so as to optimize the controller for a particular functionality.

The user interface may be in the form of a network tool. In operation, the network tool is used by a user to identify the network and sensor inputs to be provided to a controller. The network tool is further used to identify the data processing modules within the controller to which input received by the controller is to be routed. The output of the data processing modules is further configurable so as to direct the output of the data processing module to another data processing module and/or an output module.

It is an object of the present invention to allow a single controller to be used in a variety of applications without the need to re-program the controller.

It is an object of the present invention to provide a controller that includes a number of configurable data processing modules.

It is an object of the present invention to provide a controller that is optimized for a particular type of functionality.

It is an object of the present invention to provide a plurality of PID modules within a single configurable controller.

These and other advantages and features of the present invention may be discerned from reviewing the accompanying drawings and the detailed description of the preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION OF THE INVENTION

Figure 1:
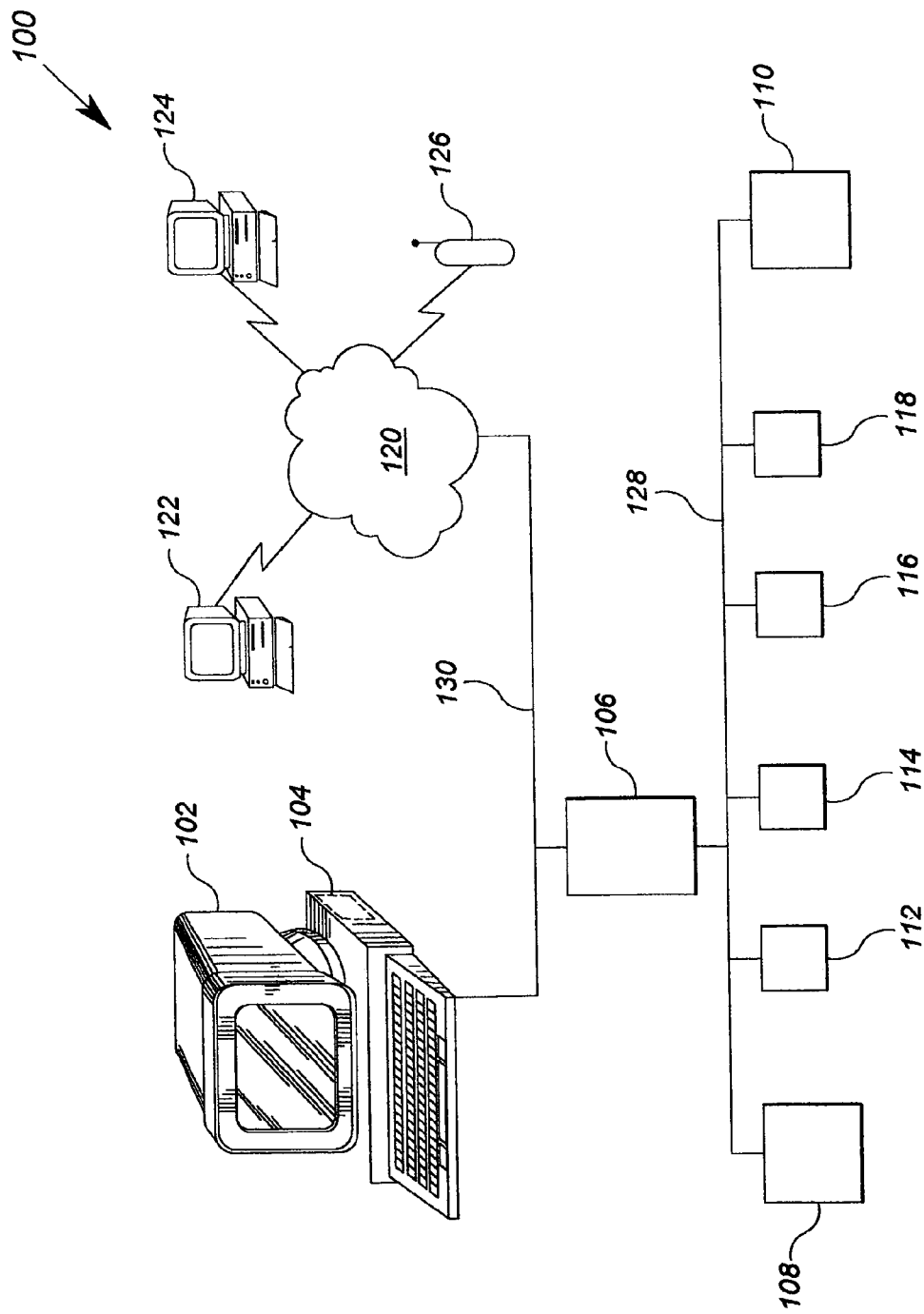
FIG. 1 shows a block diagram of a building control system in which the system and the method of the present invention may be used.

FIG. 1 shows an exemplary, representative block diagram of a building control system 100 that includes a supervisory control system 102, a system database 104, a network manager 106, programmable controllers 108 and 110, and a plurality of configurable controllers 112, 114, 116 and 118. Building control system 100 in this embodiment is accessible via a network 120 that permits access by a remote browser 122, a laptop computer 124 and/or a wireless device 126.

Each of the programmable controllers 108 and 110 and the configurable controllers 112, 114, 116, and 118 interfaces with the network manager 106 via a data network 128. The data network 128 is a low-level data network that in this embodiment employs the LonTalk protocol, also known as the ANSI/EIA 709-1 Control Networking Standard.

The network manager 106, which may suitably be a TALON® Network Manager commercially available from Siemens Building Technologies, Inc. of Buffalo Grove, Ill., is operably connected to the supervisory computer 102 through a control system network 130. The control system network 130 may be any communications protocol including Ethernet, TCP/IP, BACnet, HTTP and XML. The network manager 106 provides integrated control, supervision and network management services for the monitoring and control devices which in this embodiment comprise the programmable controllers 108 and 110 and the configurable controllers 112, 114, 116, and 118.

The supervisory computer 102 in this embodiment comprises a TALON® workstation commercially available from Siemens. The supervisory computer 102 may be used for database management, alarm management, and messaging service. The supervisory computer 102 is also used to set up and manage the components in the building control system 100.

Each of the configurable controllers 112, 114, 116 and 118 may be configured to provide direct digital control of a variety of mechanical equipment ranging from zone level control of variable air volume (VAV)/constant volume (CV), heat pumps, unit ventilators and fan coil units to air distribution units and mechanical units including spare point pick up of miscellaneous zone equipment. In an exemplary configuration shown in FIG. 2, the configurable controller 112 is configured to control equipment in a hot water converter system application.

The hot water converter system 132 includes the configurable controller 112, a water pump 134, a heat exchanger 136 and two hot water loads 138 and 140. The hot water loads 138 and 140 are used to supply heat to other systems. The amount of hot water supplied to the hot water loads 138 and 140 is controlled by the position of the control valves 142 and 144, respectively. The position of the control valves 142 and 144 may be manually set or may be controlled by another controller (not shown).

The hot water converter system 132 further includes two pressure sensors 146 and 148, a flow sensor 150 and a temperature sensor 152 which are operably connected to a set of input terminals on the configurable controller 112 that includes the input terminals 154, 156, 158 and 160. The configurable controller 112 also includes the output terminals 162, 164, 166 and 168. The output terminals 162 and 164 are operably connected to the water pump 134. The output terminals 166 and 168 are operably connected to a low range steam valve 170 and a high range steam valve 172, respectively. The low range steam valve 170 and the high range steam valve 172 control the amount of steam that flows from the steam supply header 174 to the heat exchanger 136.

Figure 3:
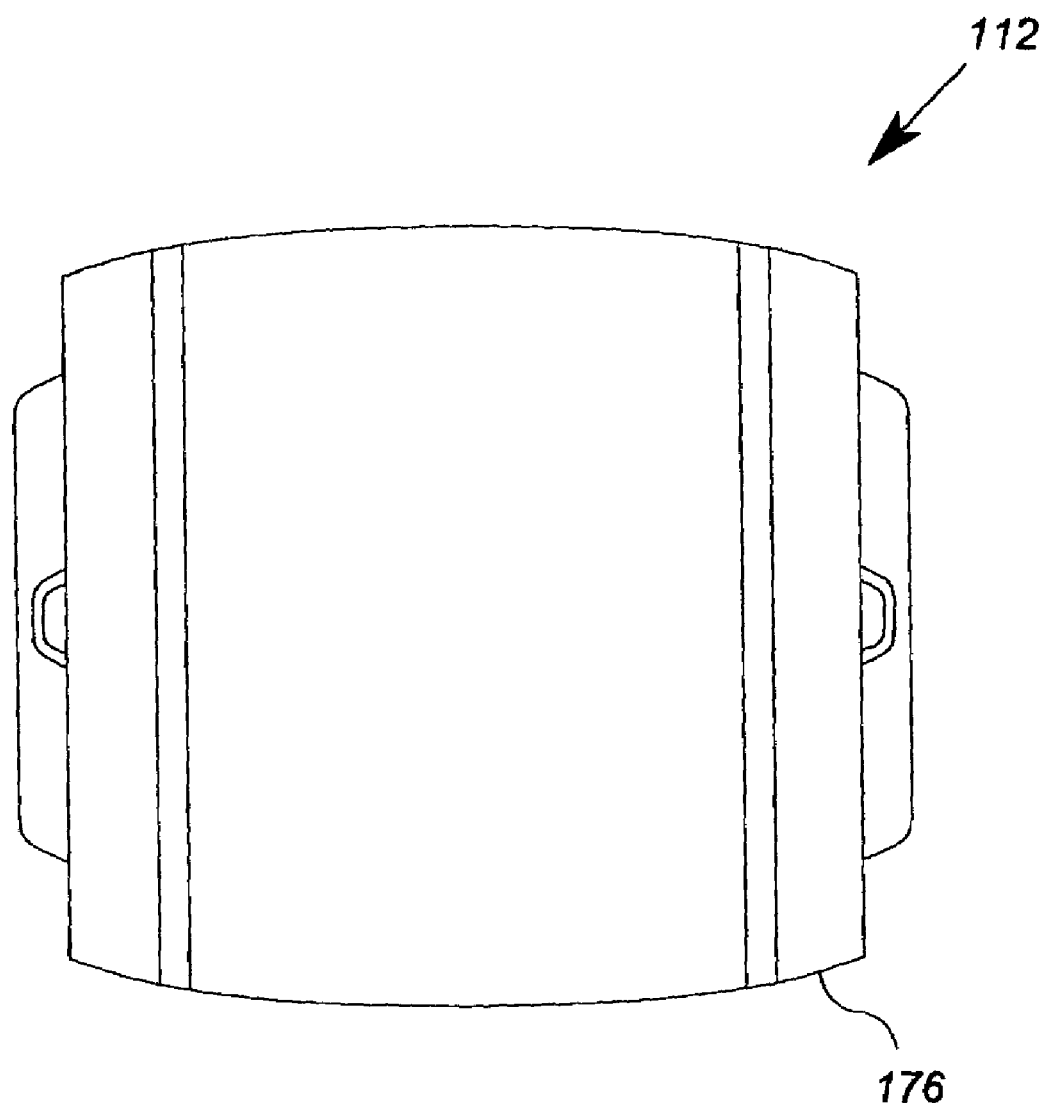
FIG. 3 shows the front housing portion of the configurable controller of FIG. 2.
Figure 4:
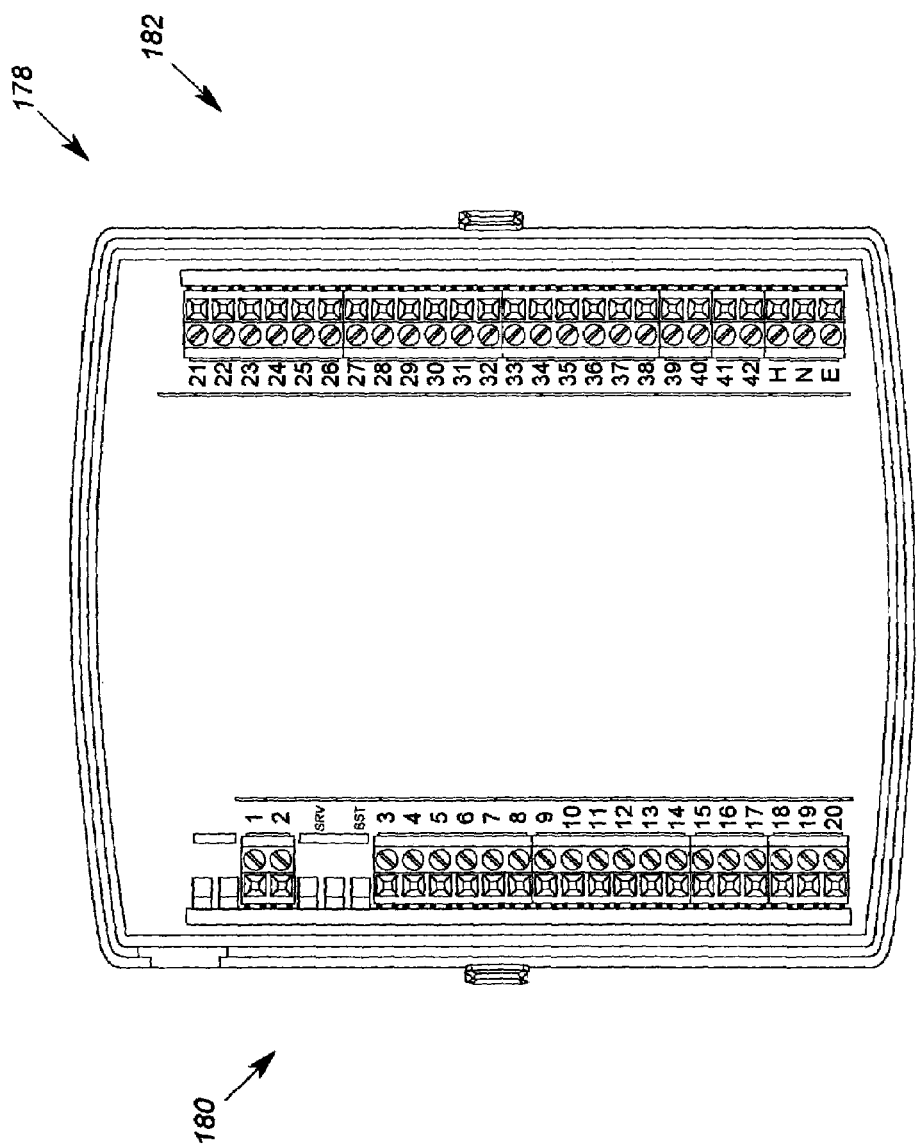
FIG. 4 shows the rear housing portion of the configurable controller of FIG. 2.

Referring to FIG. 3, the configurable controller 112, which may suitably be a PREDATOR® controller available from Siemens, comprises a front housing portion 176 and a rear housing portion 178 shown in FIG. 4. A set of input terminals 180 and a set of output terminals 182 are supported by the rear housing portion 178.

A processor (not shown) is also supported by the front housing portion 176 of the configurable controller 112. In this embodiment, the processor is a NEURON® 3150 processor commercially available from Toshiba America Electronic Components, Inc., of Irvine, Calif. The processor is programmed with a plurality of components or modules. The programming of the processor may be accomplished using a Simulink® software package commercially available from The MathWorks, Inc. of Natick, Mass.

Figure 5:
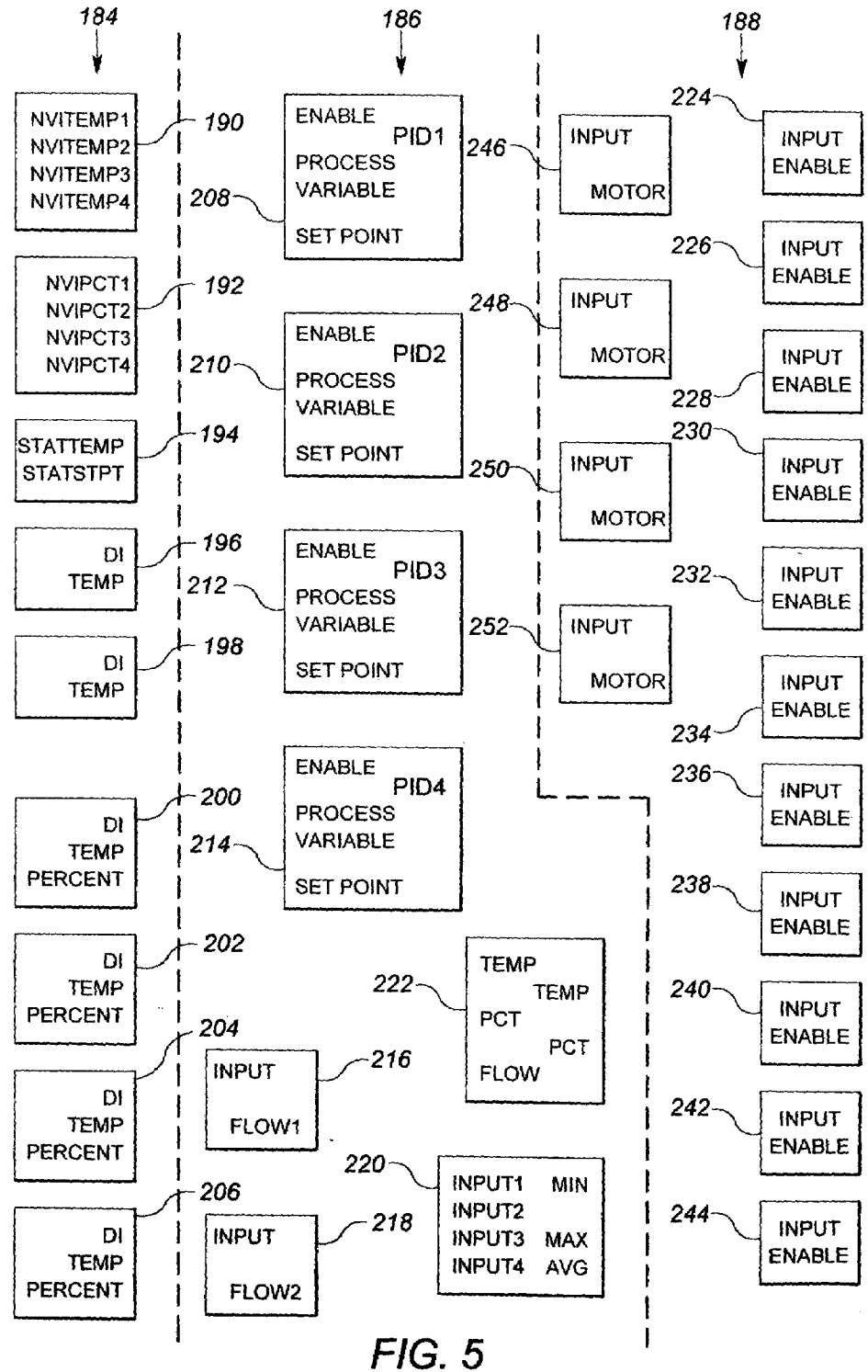
FIG. 5 shows a block diagram of the input, data processing and output components of the configurable controller of FIG. 2.

As shown in FIG. 5, the components may be generally categorized as input components 184, data processing components 186, and output components 188. The input components 184, data processing components 186, and output components 188 are programmed into a read only memory during the manufacturing process of the configurable controller 112. However, the logical connections of the inputs and outputs of the input components 184, data processing components 186, and output components 188 are not established during the manufacturing process. Accordingly, the logical connections of the inputs and outputs of the components may be configured at a later time, such as during field installation, in any one of a number of possible configurations. Thus, the configurable processor 112 may be used in a number of different applications.

The input components 184 are configured to receive signals from the input terminals 180 by means known to those of ordinary skill in the relevant art. The input components 184 include two network input modules and six non-network input modules including thermistor input modules and voltage input modules. The non-network input modules are configured to receive data from sensors that are monitoring various parameters.

In this embodiment, two network input modules, the network temperature input module 190 and the network percentage input module 192, are provided. The network input modules are used to receive inputs from the network that can be used by certain of the data processing components 186 as is described below.

The network temperature input module 190 is configured to receive up to four temperature inputs from the data network 128. This is indicated in FIG. 5 as language dependent names "nvitemp1" through "nvitemp4". The names are used in configuring the configurable controller 112 as is discussed in more detail below. The "n" indicates that the source of the value is the network. The "v" indicates that the value is a variable. The "i" indicates that the value is an input. The "temp" indicates that the value is a temperature parameter, and the last digit identifies the value as one of four values.

The network percentage input module 192 is configured to receive up to four percentage inputs from the data network 128. The names used with the identification of the values received by the network percentage input module 192, shown in FIG. 5 as "nvipct1" through "nvipct4", are similar to the names used with the network temperature input module 190. The difference is that in the network percentage input module 192, a "pct" designation is used in place of the "temp" designation, indicating that the value is a percentage.

The Staefa RTS input module 194 is configured to receive thermistor data and set point data from a Staefa TALON® RTS. This is shown in FIG. 5 as "stattemp" and "statstpt". In these names, the "stat" indicates the value is from a Staefa RTS, while the "temp" indicates that the value is a temperature, and "stpt" indicates the value is a set point. The Staefa TALON® RTS is a thermistor type sensor that uses a 10,000 ohm resistor. The Staefa TALON® RTS also includes a set point slide that allows for the room temperature set point to be adjusted. A bypass button is also provided. The bypass button is used to indicate that a room is being occupied beyond the normal occupancy schedule. When connected to a controller, the Staefa TALONS RTS accordingly provides thermistor data, bypass data and set point data to the controller. The thermistor input is filtered by the Staefa RTS input module 194 over a period of time that in this embodiment is hard coded. In this embodiment, the bypass data is only used as an enable/disable signal for other components in the controller, and is not passed to the data network 128.

The thermistor input module 196 and the thermistor input module 198 are programmed to receive analog data indicative of temperatures from 100K ohm thermistors. This is shown in FIG. 5 by the names "temp" in the thermistor input module 196 and the thermistor input module 198, which is a shorthand reference to the names "pviInxTemp". The "pvi" indicates the value is a physical variable input. The "In" indicates that the value was received as an input by a module and the "x" identifies the module as one of six non-network input modules, with the thermistor input module 196 and the thermistor input module 198 being modules number 1 and 2 respectively. The "temp" indicates that the value is a temperature. The thermistor input module 196 and the thermistor input module 198 filter the input values received, and report the filtered value of the input. The reported value is designated as "nvoInxTemp", which is similar to the input value names discussed above with the exception that the "i" is replaced with an "o" indicating that the value is an output from the module. When used as a temperature input, the thermistor input module 196 is configured to filter the input.

The thermistor input modules 196 and 198 are also programmed to receive digital data. Digital data provided to the thermistor input modules 196 and 198 are designated as "pviInxDI". The replacement of "Temp" with "DI" indicates that the value is a digital input. When digital data is received, the thermistor input modules 196 and 198 act as switches and provide the digital data as output data. The output data is named as "nvoInxDI", wherein the "o" in place of the "i" indicates that the value is an output from the identified module.

The voltage input modules 200, 202, 204 and 206 are programmed to receive an analog signal between 0 and 10 volts which is converted by the module to a percentage. The name of the voltage input data is "pviInxPct". This name follows the convention for the thermistor input modules 196 and 198 with the exception that the "Pct" indicates that the value is a percentage. The voltage input modules 200, 202, 204 and 206 are also programmed to receive a current signal between 4 and 20 mA when a resistor is added to the circuit. The current input may be used as a temperature input. The voltage input modules 200, 202, 204 and 206 may also be used as a switch when a digital signal is received, similar to the thermistor input modules 196 and 198. The names for the current and digital inputs are similar to the names for the temperature and digital inputs for the thermistor input modules 196 and 198 with the exception that the "x" is replaced with numbers 3-6 to indicate the value is associated with the voltage input modules 200, 202, 204 and 206, respectively. The same naming convention is used with the data output from the voltage input modules 200, 202, 204 and 206 as was discussed above with respect to the thermistor input modules 196 and 198, with the addition of the name "pvoLnxPct" for the output of the percentage value. When used as a temperature or percentage input, the voltage input modules 200, 202, 204 and 206 are configured to filter the input over a period of time established by the user as discussed below.

The data processing components 186 include the proportional-integral-derivative (PID) modules 208, 210, 212 and 214, the airflow modules 216 and 218, a function module 220 and a map module 222. The PID modules 208, 210, 212 and 214 are programmed to receive a set point value, a process variable value, and an enable value and to perform closed loop control by changing their output to bring the process variable to the set point. The use of PID loops in controllers is discussed in U.S. Pat. No. 6,033,302, the contents of which are herein incorporated by reference. The source of the particular value is selected by configuring the configurable controller 112. That is, by selecting the logical connections between the output of other components of the configurable controller 112, and the inputs of the PID modules 208, 210, 212 and 214.

Accordingly, the enable value for the PID modules 208, 210, 212 and 214 may be provided from any of the digital values from the input components 184, from the network, or from any of the digital outputs discussed below. Alternatively, the enable value for the PID modules 208, 210, 212 and 214 may be provided directly from the Staefa RTS. As discussed below, the user may select the manner in which the enable function operates. In general, a user may program a module to be enabled when an input signal is present, or to be enabled when the input signal is not present. Thus, a particular PID module may be programmed to be enabled unless the configured input matches the programmed value. When a match occurs, the PID module is disabled, and the output of the PID module goes to a minimum value.

The process variable value for the PID modules 208, 210, 212 and 214 may be configured to be (i) the measured temperature as relayed from the Staefa RTS input module 194, the thermistor input modules 196 and 198, or the voltage input modules 200, 202, 204 and 206, (ii) the percentage inputs as relayed from the voltage input modules 200, 202, 204 and 206, (iii) any of the inputs to the network temperature input module 190 or the network percentage input module 192, or (iv) the output of the map module 222, the function module 220, or the air flow modules 216 and 218.

With the exception of the measured temperature as relayed from the Staefa RTS input module 194, any of the inputs for the process variable value may likewise be configured to be the set point value for the PID modules 208, 210, 212 and 214. Additionally, a set point value input to the Staefa RTS input module 194, the output of another PID module or a network configuration temperature or percentage value may be configured to be the set point.

The air flow modules 216 and 218 are programmed to receive an input value indicative of a differential pressure measurement and convert that input value to an airflow reading. The input value to air flow modules 216 and 218 can be configured to be a physical variable percentage from any of the voltage input modules 200, 202, 204 or 206 or a network variable percentage from the network percentage input module 192.

The function module 220 is programmed to calculate the minimum, maximum or average of up to four inputs. The inputs to the function module 220 may be configured to be the outputs of any of the input components 184 or the data processing components 186. Additionally, one input may be configured to receive a constant value from the network, either a percentage or a temperature.

The map module 222 is programmed to perform a linear interpolation with up to four breakpoints on an input signal. Thus, for a received signal having a value 25% of the way between two of the breakpoints, the output value is 25% of the way between the two outputs associated with the two breakpoints. The input data can be a network variable, a physical variable, or a PID module output. The input data in this embodiment reflects a temperature or a percentage value.

The output components 188 include the analog output modules 224, 226, and 228, the digital output modules 230, 232, 234, 236, 238, 240, 242 and 244, and the motor output modules 246, 248, 250 and 252. The analog output modules 224, 226, and 228 are programmed to receive an input signal indicative of a percent and produce a corresponding DC output signal between 0-10 volts DC. The input can be configured to be from any of the PID modules 208, 210, 212, or 214, the function module 220, a network variable input, a network configuration input or network percentage input.

Additionally, any of the above inputs may be processed by the map module 22, with the output of the map module 22 being provided as an input to the analog output modules 224, 226, or 228. The analog output modules 224, 226, and 228 may also be configured to include a disable function such that when a network variable input, physical variable input, or another output component 188 equals the established disable function, the output of the analog output module 224, 226, or 228 goes to a minimum.

The digital output modules 230, 232, 234, 236, 238, 240, 242 and 244 are programmed to receive a percentage input and provide a 24 VAC, or Triac output signal (12 VA maximum). The input can be configured to be from any of the PID modules 208, 210, 212, or 214, the function module 220, a network variable input, a network configuration input or any of the motor output modules 246, 248, 250 or 252. The digital output modules 230, 232, 234, 236, 238, 240, 242 and 244 may also be configured to include a disable function such that when a network variable input, physical variable input, or another digital output component equals the established disable function, the output of the digital output module 230, 232, 234, 236, 238, 240, 242 and 244 goes to a minimum.

The motor output modules 246, 248, 250 and 252 are programmed to receive percentage inputs and generate a pair of digital output signals that may be used to control floating motors. The input an be configured to be from any of the PID modules 208, 210, 212, or 214, the function module 220, a network variable input, or a network configuration input. Additionally, any of the just identified inputs may be processed by the map module 22, with the output of the map module 22 being provided as an input to the motor output modules 246, 248, 250 or 252. The motor output modules 246, 248, 250 and 252 may also be configured to include a disable function such that when a network variable input, physical variable input, or the digital output modules 230, 232, 234, 236, 238, 240, 242 or 244 equals the established disable function, the output of the motor output modules 246, 248, 250 and 252 goes to a minimum.

Figure 2:
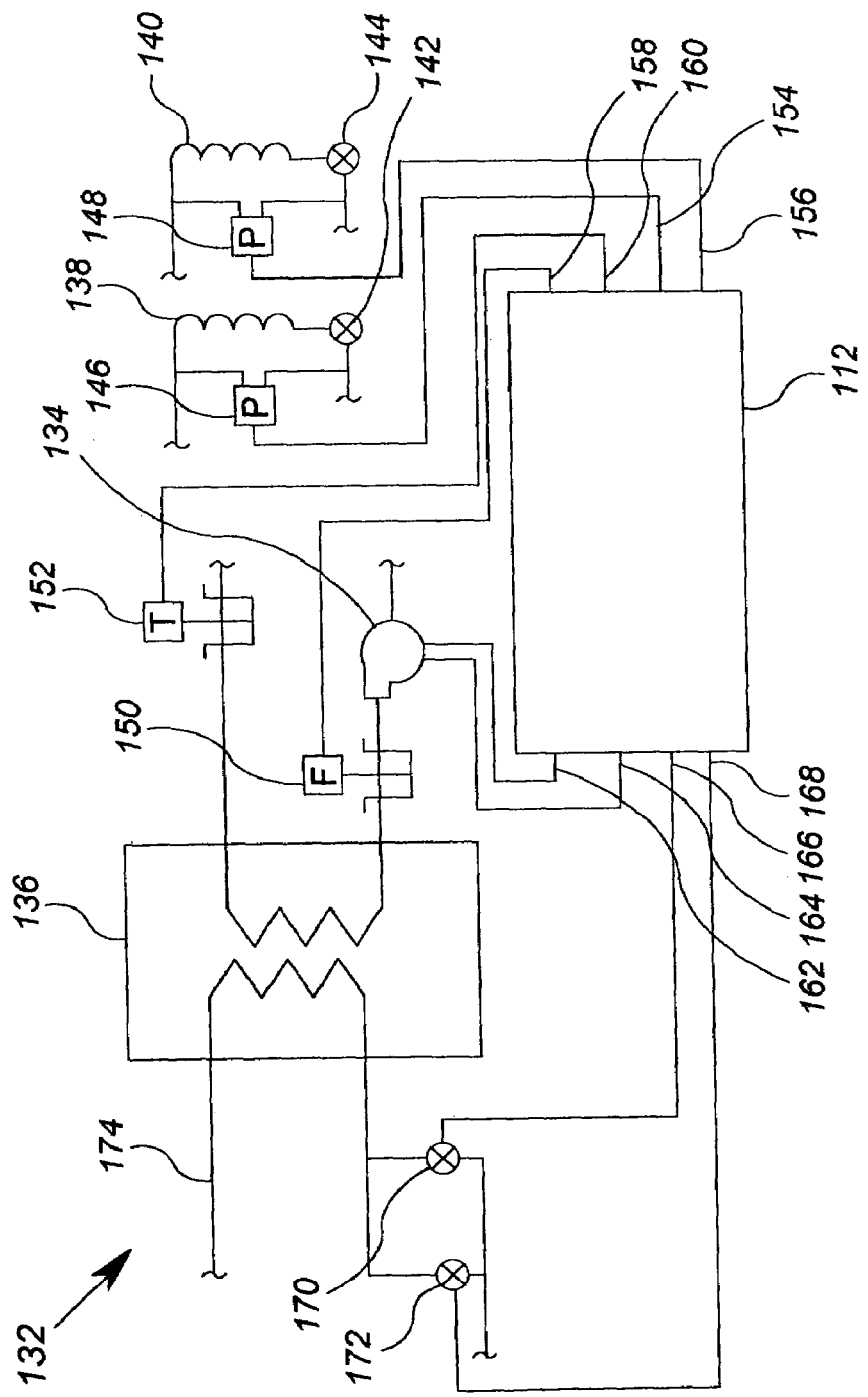
FIG. 2 shows a schematic diagram of a configurable controller in accordance with the present invention installed into a hot water converter system.
Figure 6:
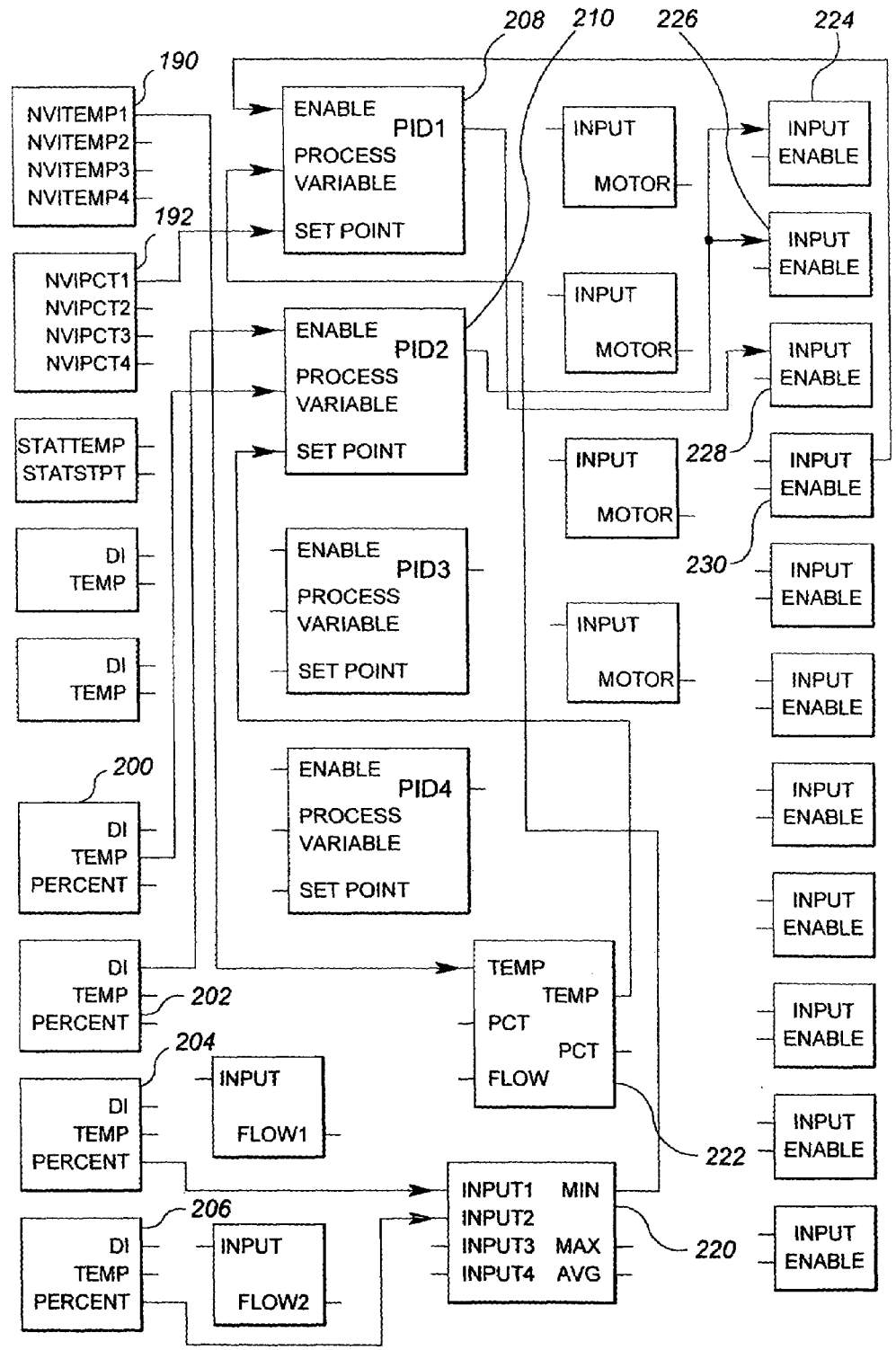
FIG. 6 shows the block diagram of FIG. 5 with logical connections for configuration of the configurable controller of FIG. 2 in the hot water converter system of FIG. 2.

FIG. 6 shows a block diagram of the pre-programmed components of the configurable controller 112 along with the logical connections that have been configured between the components to control the hot water converter system shown in FIG. 2. The operational concept of the hot water converter system 132 is described with reference to FIG. 1, FIG. 2 and FIG. 6. The basic operation of the hot water converter system 132 is to transfer heat from steam supplied by the steam supply header 174 to the secondary hot water supply through the heat exchanger 136. The heat energy is then transferred to the hot water loads 138 and 140. The configurable controller 112 is programmed to maintain a constant pressure and supply temperature in the secondary hot water supply, so that a consistent amount of heat energy is transferred to the hot water loads 138 and 140 for a given position of the control valves 142 and 144, respectively.

In operation, a need for hot water in a load such as the hot water load 138 or 140 is sensed by a device on the network 120, which issues a start command to the water pump 134. The network 120 also sends a network variable to the configurable controller 112 through the data network 128 indicating that the water pump 134 has been started. This network variable is passed to the digital output module 230, which sends an enable signal to the PID module 208, thus enabling the configurable controller 112 to control the speed of the hot water pump 134 through the output of output module 228.

The data network 128 also sends a network variable to the configurable controller 112 indicating the minimum pressure that is to be maintained in the secondary hot water supply. The minimum pressure network variable is received by the network percentage input module 192 which passes the network variable to the PID module 208 as a set point. In general, the speed of the water pump 134 controls the pressure in the system. Thus, as the speed of the water pump 134 increases, the pressure increases.

The configurable controller 112 also receives input from the pressure sensors 146 and 148 through the voltage input modules 204 and 206, respectively. The voltage input modules 204 and 206 convert the signals from the pressure sensors 146 and 148 into a percent pressure, and pass the data to the function module 220. The function module 220 compares the data from the two sensed pressures and passes the data indicating the minimum percent pressure sensed to the PID module 208 as a process variable. Based upon a comparison of the input process variable and the set point, the PID module 208 generates a signal to increase, decrease or maintain the speed of water pump 134 to the analog output module 228 which sends a speed control output signal to the water pump 134, thereby controlling the speed of the water pump 134 to maintain the secondary hot water system pressure at the set point established by the network 120.

Once the water pump 134 is running, there will be flow in the secondary hot water system which is sensed by the flow sensor 150. The flow signal is passed to the voltage input module 202 as a digital signal indicating that flow is present. The voltage input module passes the digital signal to the PID module 210 as an enable signal, enabling the configurable controller 112 to control the valve position of the low range steam valve 170 and the high range steam valve 172. The temperature set point for the secondary hot water system is passed as a network variable input from the data network 128 to the network temperature input module 190. The network variable is passed from the network temperature input module 190 to the map module 222 which generates an output based upon the value of the network variable. The output from the map module 222 is passed to the PID module 210 as the temperature set point for the secondary hot water system.

The temperature within the secondary hot water system is sensed by the temperature sensor 152, and a signal indicative of the sensed temperature is passed to the voltage input module 200 in the form of a current signal. The temperature signal is passed from the voltage input module 200 to the PID module 210 as a process variable. Based upon a comparison of the temperature set point received by the map module 222 and the sensed temperature input, the PID module 210 generates an output signal indicating whether more steam (heat), less steam, or an unaltered amount of steam is needed. The generated signal is passed to the analog output modules 224 and 226 which generate output signals to control the valve positions of the control valves 170 and 172, respectively. The system is programmed such that as more steam flow is needed, the low range steam valve 170 is opened. If the low range steam valve 170 is fully opened, then the high range steam valve 172 is controlled in the open direction.

The positioning of the low range steam valve 170 and the high range steam valve 172 controls the amount of steam that is allowed to flow through the heat exchanger 136, thus controlling the heat exchange with the secondary hot water supply to control the temperature of the secondary hot water supply to the set point commanded by the network 120.

Figure 7:
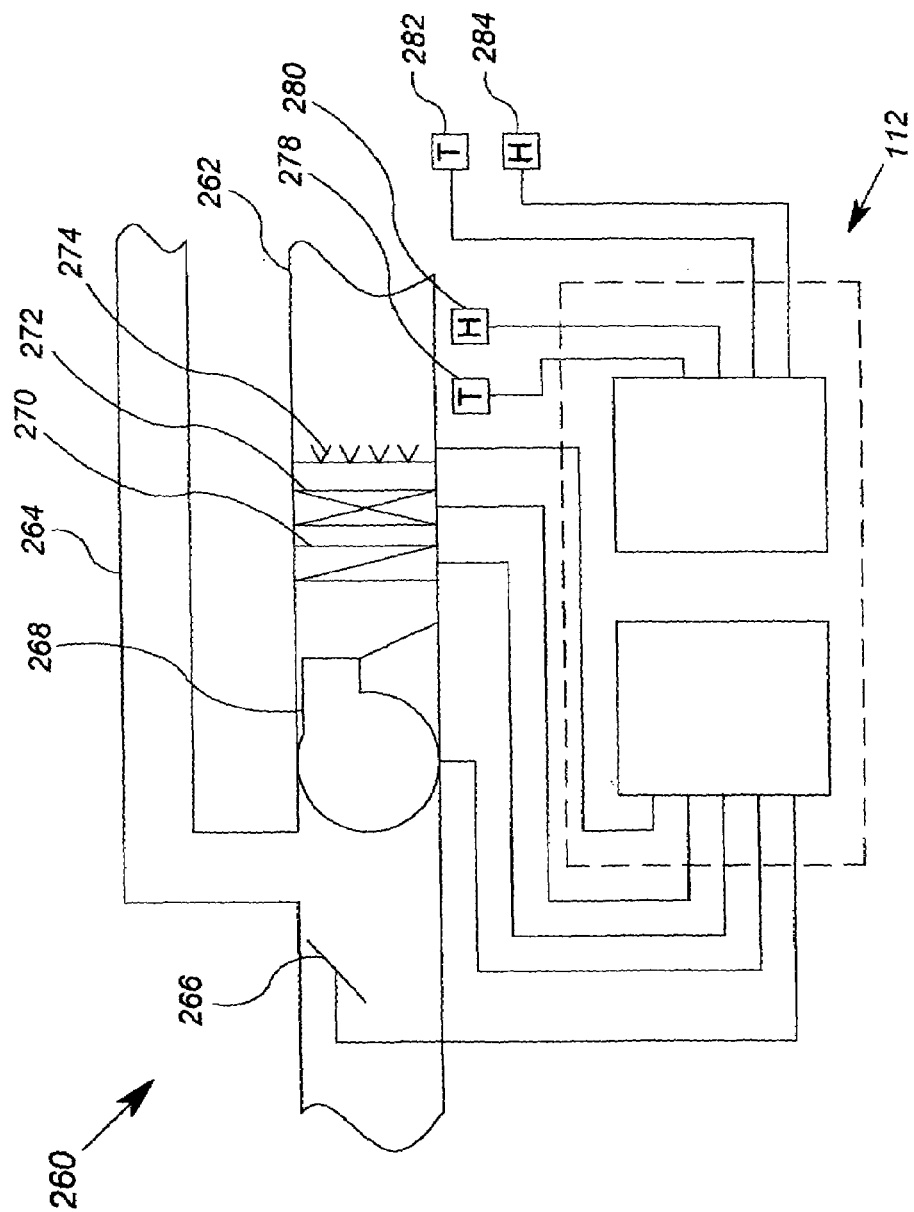
FIG. 7 shows a schematic diagram of a configurable controller in accordance with the present invention installed into a single zone temperature and humidity control system.

The configurable controller 112 may be configured to provide control in other applications. By way of example, but not of limitation, FIG. 7 shows the configurable controller 112 controlling a single zone air handler with a humidifier. The single zone system 260 includes the configurable controller 112, an air supply header 262, a return header 264, an outside air (OA) damper 266, a fan 268, a heater 270, a cooler 272 and a humidifier 274. The single zone system 260 also includes a variety of sensors including a supply header temperature sensor 278, a supply header humidity sensor 280, a zone temperature sensor 282 and a zone humidity sensor 284. The configuration of the controller 112 in the embodiment of FIG. 7 is discussed in co-pending U.S. Application No. 60/557,979 filed on Mar. 31, 2004, the entire contents of which are incorporated herein by reference.

Figure 8:
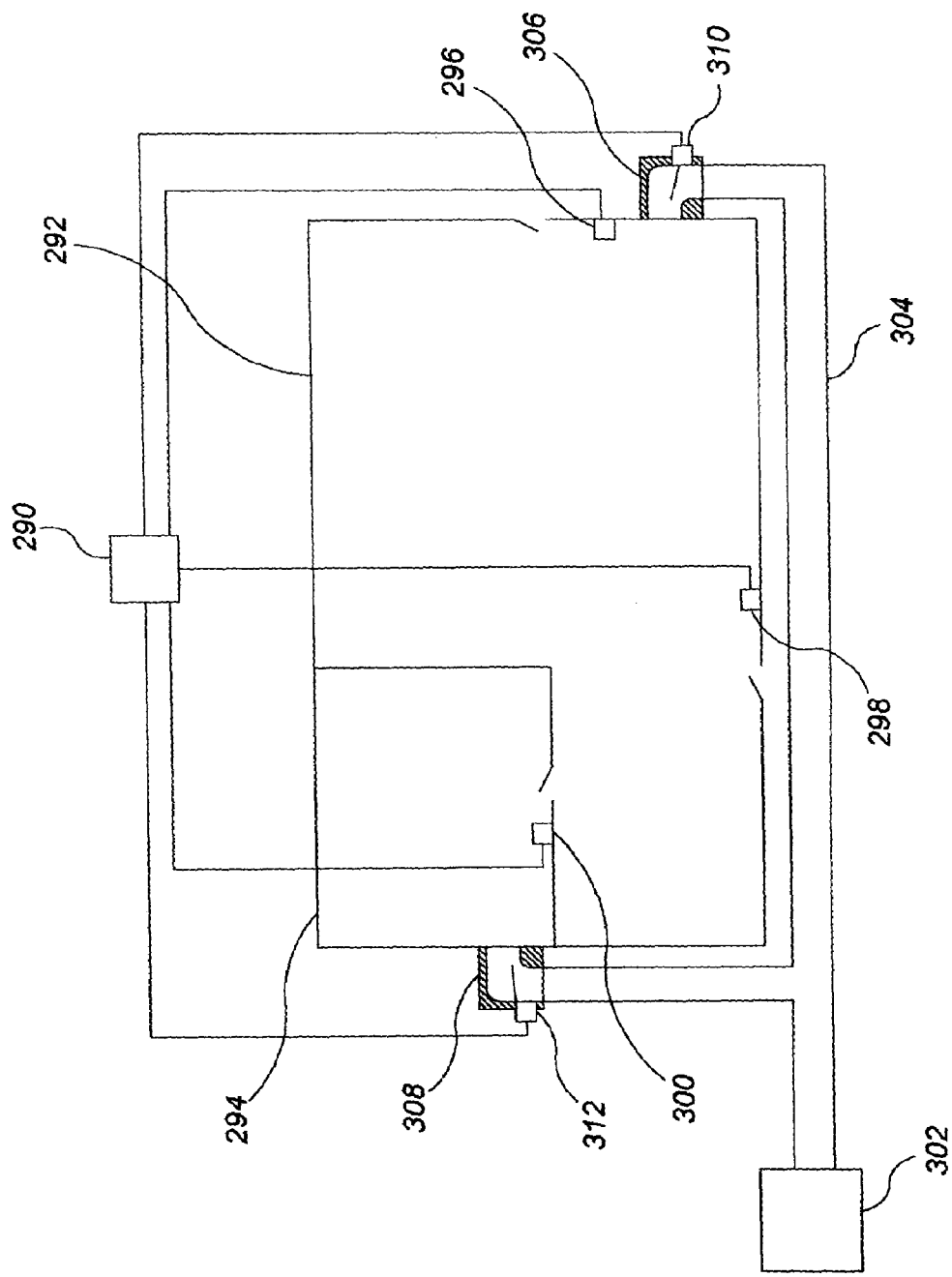
FIG. 8 shows a schematic diagram of a configurable controller in accordance with the present invention installed into a two zone temperature control system.

FIG. 8 shows an exemplary configuration of the present invention that provides three zone temperature control. The space that is being controlled by the configurable controller 290 includes an open plan area 292 and a private office 294. Two zone temperatures sensors 296 and 298 are located within the open plan area 292 and a third zone temperature sensor 300 is located within the private office 294. The temperature sensors 296, 298 and 300 are Staefa RTS sensors including a bypass button and a temperature set point slide control. In this embodiment, the configurable controller 290 only receives input from the temperature set point slide of the temperature sensors 298 and 300. Thus, the private office 294 may be controlled to a temperature different from the temperature to which the open plan area 292 is controlled.

Conditioned air is provided to the open plan area 292 and the private office 294 by AHU 302 through an air supply header 304. In FIG. 8, the air supply header is shown supplying air through the dampers 306 and 308. Of course, the AHU 302 may further supply air to other areas. The positioning of the dampers 306 and 308 is controlled by the actuators 310 and 312, respectively, in response to control signals from the configurable controller 290.

The configurable controller 290 in this embodiment is a PREDATOR® controller, and is programmed and installed in a manner similar to the configurable controller 112 using the tools and interfaces described in co-pending U.S. application Ser. No. 10/897,416. However, the configurable controller 290 is directed to the particular function of controlling temperature in a three zone area. Thus, there are some differences between the configurable controller 112 and the configurable controller 290 which are described below.

Figure 9:
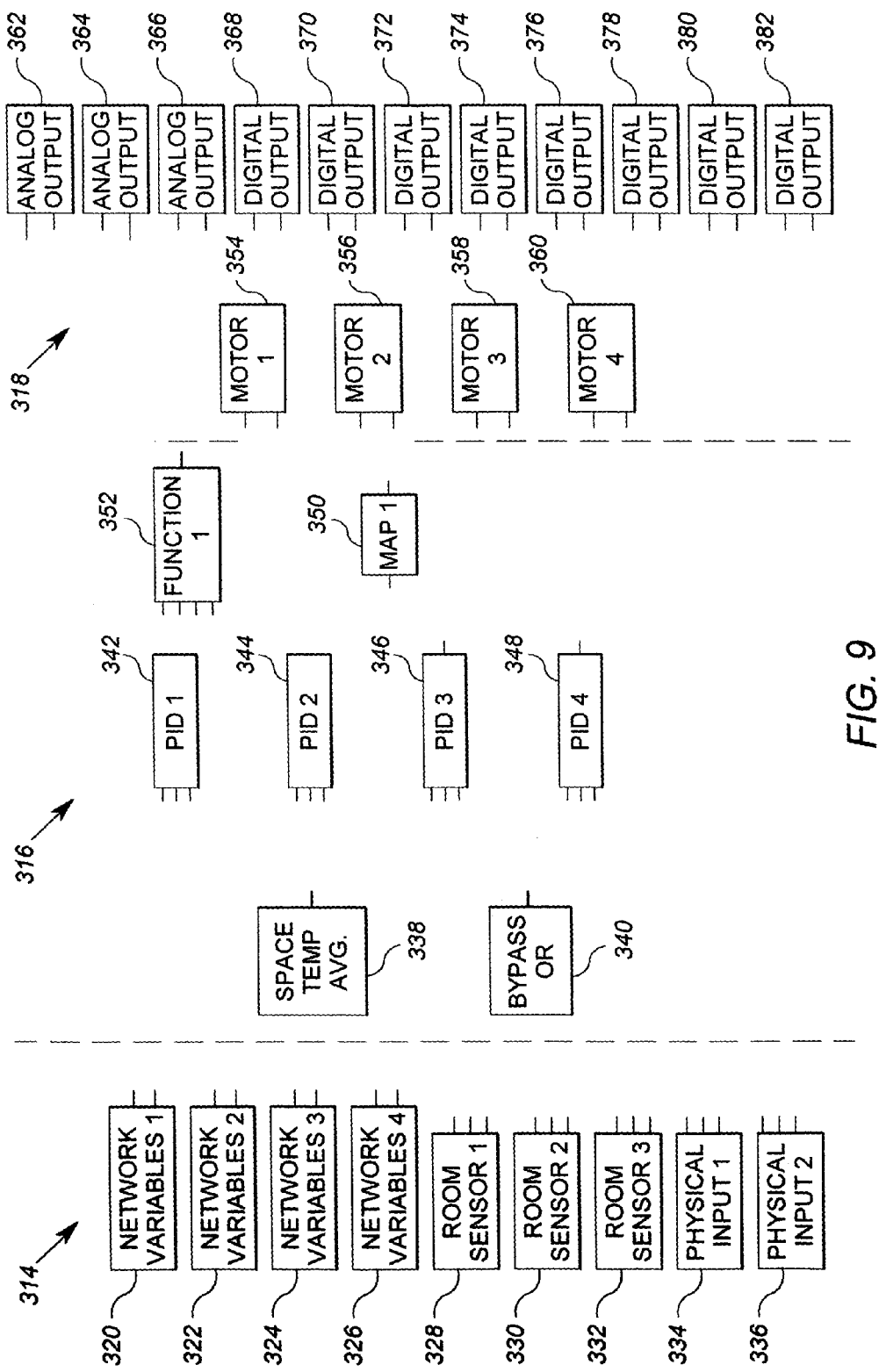
FIG. 9 shows a block diagram of the input, data processing and output components of the configurable controller of FIG. 8.

As shown in FIG. 9, the components of the configurable controller 290 may be generally categorized as input components 314, data processing components 316, and output components 318. The input components 314, data processing components 316, and output components 318 are programmed into a read only memory during the manufacturing process of the configurable controller 290. However, while the logical connections of the inputs and outputs of the input components 314, data processing components 316, and output components 318 may be provided in a default configuration, the logical connections are not fixedly established during the manufacturing process. Accordingly, as with the configurable controller 112, the logical connections of the inputs and outputs of the components may be configured at a later time, such as during field installation, in any one of a number of possible configurations.

The input components 314 are configured to receive signals from input terminals by means known to those of ordinary skill in the relevant art. The input components 314 include four network input modules 320, 322, 324 and 326, three room sensor input modules 328, 330 and 332, and two physical input modules 334 and 336.

The network input modules 320, 322, 324 and 326 are programmed to receive input from the network in the form of a temperature. The network input modules 320 and 322 are further programmed to receive a percent input. The percent input may be used to establish minimum or maximum values. The naming convention for the network variables and configuration properties, which for one embodiment are set forth below, may the same as was described above with respect to the configurable controller 112 and is not repeated here. The room sensor input modules 328, 330 and 332 are programmed to receive input from Staefa RTS type room sensors. Accordingly, the configurable controller 290 is provided with resistors and other hardware selected to properly pass a received signal to the room sensor input modules 328, 330 and 332. In this embodiment, the room sensor input modules 328, 330 and 332 accept signals indicative of the sensed temperature, a temperature set point slide and/or a bypass button.

The physical inputs 334 and 336 can be assigned as digital inputs, temperature inputs or percent inputs. The physical inputs 334 and 336 also provide respective outputs indicating the state of the physical inputs 334 and 336.

The data processing components 316 include a space temperature function module 338, a bypass function module 340, four PID modules 342, 344, 346 and 348, a map module 350 and a function module 352. The map module 350 and the function module 352 operate in a manner similar to the map module 222 and function module 220 of the configurable controller 112.

The space temperature function module 338 is operable to calculate a minimum, maximum or average of two or three temperature inputs. The input to the space temperature function module 338 is thus constrained to inputs indicative of a sensed temperature. The mode of operation and number of temperature inputs is set using a configuration property. In this embodiment, when two inputs are selected, the configurable controller 290 will route the signals received from the room sensor input modules 330 and 332 to the space temperature function module 338.

The bypass function module 340 will accept one, two or three inputs. Accordingly, while a bypass button on a room sensor may be used independently as an enable or disable signal, when the bypass function module 340 is configured to accept two inputs, the bypass function module 340 applies an "OR" function to the signals from the bypass buttons. Thus, when two inputs do not initially indicate a bypass signal is present and a first of two inputs changes state to indicate a bypass signal is present, the bypass function module 340 will change its output to either a disable signal or an enable signal.

The PID modules 342, 344, 346 and 348 are programmed differently from the PID modules 208, 210, 212 and 214. In this embodiment, the PID modules 342, 344, 346 and 348 operate in a proportional band mode when a percent input is applied to the PID modules 342, 344, 346 and 348. A "proportional band" expresses the gain of the module as a percentage of the span of the instrument. Additionally, the PID modules 342 and 344 are constrained to temperature control. Accordingly, the constrained PID modules 342 and 344 in this embodiment are only used in controlling temperature within a space or spaces. This allows the execution rate for the PID modules 342 and 344 to be set at twenty seconds. This relatively long execution rate does not detract from the function of the configurable controller since the actual temperature in a space being monitored changes relatively slowly. In contrast, the PID modules 346 and 348 are set at a two second execution rate to allow for finer control of faster processes such as the positioning of a damper with a motor.

The inputs for the PID modules 342 and 344 are reduced as compared to the PID modules 346 and 348 as a result of the dedicated temperature control function performed by the PID modules 342 and 344. The allowed inputs for the PID modules 342 and 344 are set forth in the following table which identifies by reference number the allowed inputs:

|  | PID Process Variable | PID Set Point |
|---|---|---|
| Space Temp | 328, 330, 332 |  |
| Temp Set Point |  | 328, 330, 332 |
| Physical Input temp |  | 334, 336 |
| Physical Input pct |  |  |
| Network Input temp 1-4 |  | 320, 322, 324, 326 |
| Network Input pct 1-2 |  |  |
| PID output |  |  |
| Map module output | 350 | 350 |
| Function module output | 352 | 352 |
| Configuration Network input (nciTemp) |  | 342, 344 |
| Configuration Network. input (nciPct) |  |  |
| Space Temp module | 338 |  |

In contrast, allowed inputs for the PID modules 346 and 348 are set forth in the following table:

|  | PID Process Variable | PID Set Point |
|---|---|---|
| Space Temp | 328, 330, 332 |  |
| Temp Set Point |  | 328, 330, 332 |
| Physical Input temp | 334, 336 | 334, 336 |
| Physical Input pct | 334, 336 | 334, 336 |
| Network Input temp 1-4 | 320, 322, 324, 326 | 320, 322, 324, 326 |
| Network Input pct 1-2 | 320, 322 | 320, 322 |

|  | PID Process Variable | PID Set Point |
|---|---|---|
| PID module output |  | 342, 344, 346, 348 |
| Map module output | 350 | 350 |
| Function module output | 352 | 352 |
| Configuration Network. input (nciTemp) |  | 320 |
| Configuration Network. input (nciPct) |  | 320 |
| Space Temp module | 338 |  |

The output components 318 include four motor modules 354, 356, 358 and 360, three analog outputs 362, 364 and 366, and eight digital output modules 368, 370, 372, 374, 376, 378, 380 and 382. The output components 318 function in the same manner as the output components 188 of the configurable controller 112, with the exception that the motor modules further provide a status signal indicative of the motor position.

In addition to the above described differences, the disable sources and input sources for many of the components in the configurable controller 290 are different from the disable sources and input sources for many of the components in the configurable controller 112. The PID modules 342, 344, 346, and 348, the analog output modules 363, 364 and 366, the digital output modules 368, 370, 372, 374, 376, 378, 380 and 382, and the motor modules 354, 356, 358 and 360 may all be disabled. The disable sources for all of the components that may be disabled may be set to a bypass input or an occupancy signal from the network through the room sensor input modules 328, 330 and 332, a digital input from the physical input modules 334 and 336, a digital signal from the digital output modules 372, 374, 376, 378, 380 and 382, or the output of the bypass function module 340. As was true with the configurable controller 112, the disable may be effective when the signal is true (present) or false (not present).

The input sources for the data processing components 316 (other than the PID modules 342, 344, 346 and 348 which are set forth above) and the output components 318 are set forth in the following table:

|  | Space Temp Module (338) | Map Module (350) | Function Module (352) | Analog Output Module (362-366) | Digital Output Modules (368-382) | Motor Module (354-360) |
|---|---|---|---|---|---|---|
| SpaceTemp | 328, 330, 332 | 328, 330, 332 | 328, 330, 332 |  |  |  |
| Set Point |  | 328, 330, 332 | 328, 330, 332 |  |  |  |
| Physical temp |  | 334, 336 | 334, 336 |  |  |  |
| Physical pct |  | 334, 336 | 334, 336 | 334, 336 | 334, 336 | 334, 336 |
| Network temp 1-4 |  | 320, 322, 324, 326 | 320, 322, 324, 326 |  |  |  |
| Network pct |  | 320, 322 | 320, 322 | 320, 322 | 320, 322 | 320, 322 |
| PID |  | 320, 322, 324, 326 | 320, 322, 324, 326 | 320, 322, 324, 326 | 320, 322, 324, 326 | 320, 322, 324, 326 |
| Map |  |  | 350 | 350 | 350 | 350 |
| function | 352 |  |  | 352 | 352 | 352 |
| nciTemp |  |  | 320 |  |  |  |
| nciPct |  |  | 320 | 320 | 320 | 320 |
| spctemp function |  | 338 | 338 |  |  |  |

Figure 10:
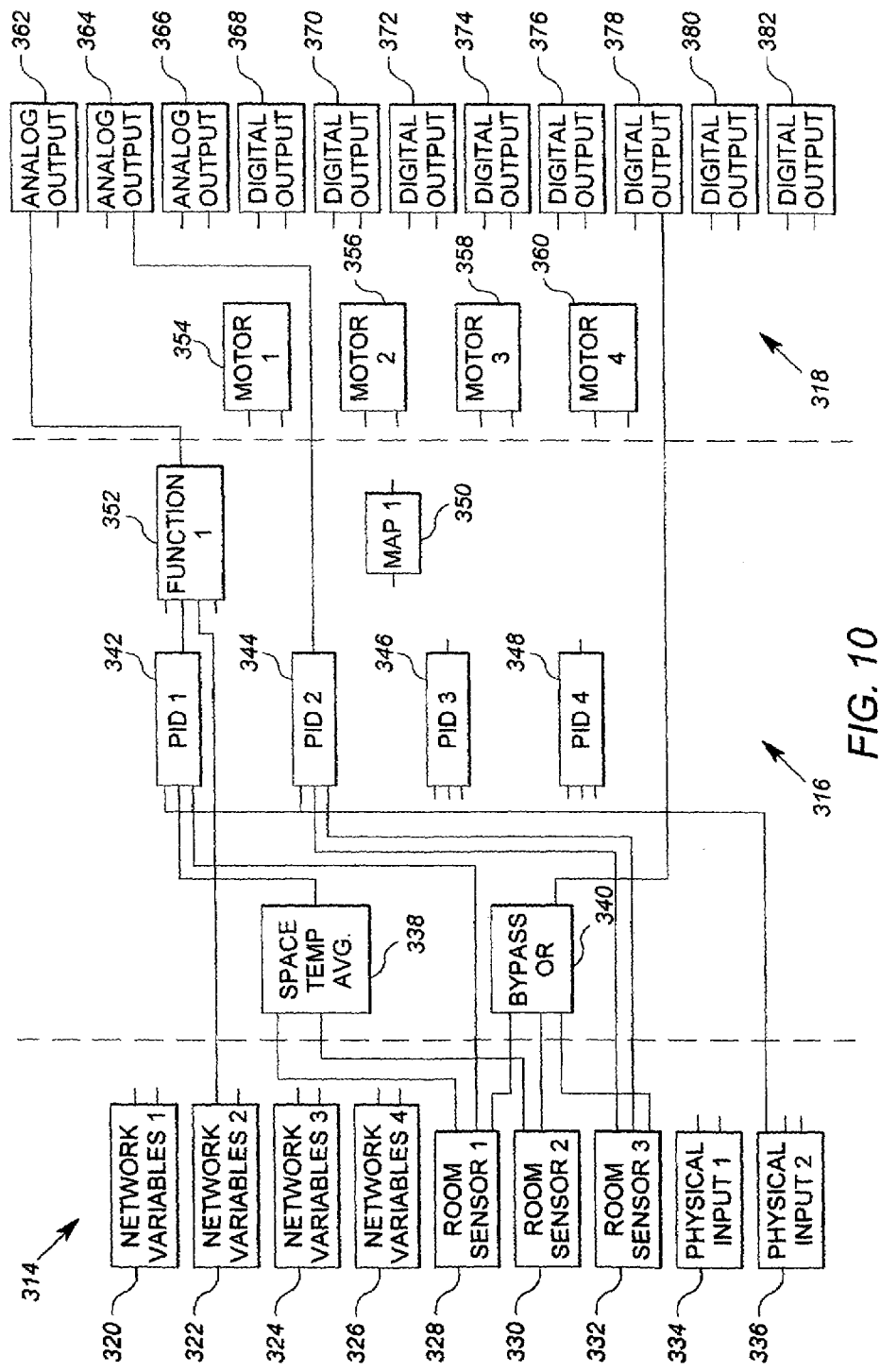
FIG. 10 shows the block diagram of FIG. 9 with logical connections for configuration of the configurable controller of FIG. 8 in the two zone temperature control system of FIG. 8.

Referring now to FIG. 10, a simplified block diagram of the input components 314, the data processing components 316, the output components 318 and the logical connections between those components for the configurable controller 290 of FIG. 8 is shown. The room sensor module 328 receives signals from the temperature sensor 296 including a temperature signal, a temperature set point slide signal and a bypass signal. The room sensor module 328 forwards the temperature signal to the space temperature function module 338. The temperature set point slide signal is forwarded to the PID module 342 and the bypass signal is forwarded to the bypass function module 340.

The room sensor module 330 receives signals from the temperature sensor 298. In this embodiment, the temperature set point slide of the temperature sensor 298 is disabled. Thus, only a temperature signal and a bypass signal are sent to the room sensor module 330. The temperature signal is forwarded by the room sensor module 330 to the space temperature function module 338. The bypass signal is forwarded to the bypass function module 340.

The room sensor module 332 receives signals from the temperature sensor 300 including a temperature signal, a temperature set point slide signal and a bypass signal. The room sensor module 332 forwards the temperature signal and the temperature set point slide signal to the PID module 344 and the bypass signal is forwarded to the bypass function module 340.

The physical input module 336 receives a signal from a pressure sensor associated with the air supply header 304 which indicates whether or not the AHU 302 is operating. The pressure signal is forwarded to the PID modules 342 and 344 as an enable signal. A network variable is further received by the network variable module 322 and forwarded to the function module 352.

The space temperature function module 338 averages the temperature signals received from the room sensor modules 328 and 330 and sends a signal indicating the average temperature in the open plan area 292 to the PID module 342. The bypass function module 340 is configured to provide an "OR" function. Accordingly, if a bypass signal is received from at least one of the room sensor modules 328 and/or 332, then the bypass function module 340 forwards a bypass signal to the digital output 378.

The output from the digital output 378 may be monitored by a higher level controller. The higher level controller in such embodiments sends an occupied command to the room sensors 296 and 300 when a bypass state is indicated by the output of the digital output 378. When an occupied command is received, the room sensors 296 and 300 apply an occupied "offset" to the set point indicated by the set point slider. The "offset" is a number that is applied to the set point signal to create a deadband between heating and cooling signals. For example, if an offset is one degree and the set point slider is set to maintain temperature at 72 degrees, then heating would commence when the sensor senses 71 degrees and cooling would commence when the sensor senses 73 degrees.

Accordingly, an occupied offset may be established, for example, at one degree while an unoccupied offset is established at 5 degrees. This allows the smaller offset to be used when an area is occupied so as to provide increased comfort to the occupants and the larger offset to be applied when the area is unoccupied to decrease energy use. Of course, an offset value may also be set in PID modules 342 and 344. The temperature bands and the timing of the occupied/ unoccupied status when using the PID module offsets are set by the network using configuration properties sent to the configurable controller 290. However, it is preferred to use only the offset associated with the room sensors when a deadband based upon occupancy is used.

The PID module 342 receives an enable signal from the physical input module 336. The average temperature in the open plan area 292 is received as a process variable from the space temperature function module 338. The temperature set point slide signal from the temperature sensor 296 is received from the room sensor module 328 as the set point for the PID module 342. The output control signal from the PID module 342 is routed to the function module 352.

The PID module 344 receives an enable signal from the physical input module 336. The temperature in the private office 294 is received as a process variable from the room sensor module 332. The temperature set point slide signal from the temperature sensor 300 is received from the room sensor module 332 as the set point for the PID module 344. The output control signal from the PID module 344 is routed to the analog output module 364.

The function module 352 compares the signals received from the network variable module 322 and the PID module 342, and forwards the larger of the received signals to the analog output module 362.

The analog output module 362 receives the signal from the function module 352 and issues a corresponding control signal to the actuator 310 to position the damper 306. The analog output module 364 receives the signal from the PID module 344 and issues a corresponding control signal to the actuator 312 to position the damper 308. The digital output module 378 forwards any bypass signal received from the bypass function module 340 as a network bypass signal.

In one mode of operation, the configurable controller 290 maintains an occupied or unoccupied temperature band around the temperature set point set for the open plan area 292 and the private office 294 based upon the temperature set point slide signals from the temperature sensors 298 and 300, respectively. As discussed above, the temperature bands and the timing of the occupied/unoccupied status may be set by the network using configuration properties sent to the configurable controller 290. Typically, the occupied/ unoccupied status in such an embodiment is based upon normal working hours of those individuals in the open plan area 292 and the private office 294. However, the occupied/ unoccupied status can be modified based upon the status of the bypass buttons on the temperature sensors 298 and 300 as explained in the following example.

Initially, the configurable controller 290 is providing unoccupied temperature control based upon temperature set point slide signals from the temperature sensors 298 and 300 and the AHU 302 is operating. Accordingly, an airflow signal based upon an airflow sensor in the air supply header 304 is sent to the physical input module 336. This signal is forwarded to the PID modules 342 and 344 as an enable signal and a large temperature band (unoccupied band) is maintained by the PID modules 342 and 344. The status of the room is changed when either the bypass button on the temperature sensor 296, the temperature sensor 298 or the temperature sensor 300 is activated. For this example, the bypass button on the temperature sensor 296 is activated.

The temperature sensor 296 forwards the bypass button signal to the room sensor input module 328 which in turn forwards the signal to the bypass function module 340. Because the bypass function module 340 is providing an "OR" function, receipt of the bypass signal results in a bypass signal being output to the digital output module 378 which in turns outputs a network bypass signal. In response, a higher level controller issues an "occupied" command to the temperature sensors 298 and 300. Accordingly, an occupied offset is applied to the temperature set point slide signals from the temperature sensors 298 and 300, and the occupied offset set point slide signal is set to the controller 290. Thus, the configurable controller 290 provides occupied temperature control and maintains the temperature in the open plan area 292 and the private office 294 within the occupied temperature band (narrow band).

Specifically, the temperatures sensed by the temperature sensors 296 and 298 are sent to the room sensor input modules 328 and 330, respectively. Both of the sensed temperature signals are forwarded to the space temperature function module 338 which averages the temperature signals and sends a signal indicative of the average sensed temperature in the open plan area 292 to the PID module 342 as a process variable. The room sensor module 328 also receives the occupied offset set point signal from the temperature sensor 296 which is forwarded to the PID module 342 as the temperature set point.

The PID module 342 further receives an enable signal from the physical input module 336 since the AHU 302 is providing air to the air supply header 304. Accordingly, the PID module 342 compares the indicated temperature to the occupied offset set point temperature and generates a control signal to position the damper 306. The positioning signal from the PID module 342 is in the form of a percent open. Thus, the signal indicates that the damper 306 should be, for example, 50 percent open.

The control signal from the PID module 342 is received by the function module 352 along with a percent open signal from the network input module 322. The function module is programmed in this embodiment to output the larger of the received input signals. Thus, the signal from the network input module 322 functions as a minimum open signal which in this example is indicative of a 20 percent open position for the damper 306. Because the control signal from the PID module 342 is larger (more open) than the signal from the network input module 322, the signal from the PID module 342 is forwarded to the analog output module 362. The analog output module 362 then generates a control signal which is sent to the actuator 310 controlling the damper 306 to the 50 percent open position.

The configurable controller 290 further controls the temperature in the private office 294. The room sensor module 332 receives a sensed temperature signal from the temperature sensor 300 which is forwarded to the PID module 344 as a process variable. The position of the set point slider on the temperature sensor 300 with an occupied offset is also sent to the room sensor module 332 and forwarded to the PID module 344 as the set point value.

The PID module 344 also receives the enable signal from the physical input module 336. Accordingly, the PID module 344 compares the sensed temperature to the occupied offset temperature set point and generates a control signal. The control signal from the PID module 344 is received by the analog output module 364 which in turns generates a control signal to the actuator 312 to position the damper 308.

Of course, those of ordinary skill in the relevant art will appreciate that in accordance with the present invention the configurable controller 290 may be configured to provide additional or different functionality by providing for additional or different output signals, supplying additional or different input signals, and/or making additional or different logical connects between the components of the configurable controller 290. Such flexibility is provided in one embodiment by designing the configurable controller 290 to be operable to receive or output the following network variables:

| FUNCTION | TYPE | Input/Output |
| --- | --- | --- |
| StatSpaceTemp1 | SNVT_temp_p | O |
| StatSetpoint1 | SNVT_temp_p | O |
| StatSpaceTemp2 | SNVT_temp_p | O |
| StatSetpoint2 | SNVT_temp_p | O |
| StatSpaceTemp3 | SNVT_temp_p | O |
| StatSetpoint3 | SNVT_temp_p | O |
| Occupancy1 | SNVT_occupancy | O |
| Occupancy2 | SNVT_occupancy | O |
| Occupancy3 | SNVT_occupancy | O |
| Temperature input 5 | SNVT_temp_p | O |
| Temperature input 6 | SNVT_temp_p | O |
| Status DI5 | SNVT_switch | O |
| Status DI6 | SNVT_switch | O |
| Status Pct5 | SNVT_lev_percent | O |
| Status Pct6 | SNVT_lev_percent | O |
| Override AO1 | SNVT_lev_percent | I |
| Override AO2 | SNVT_lev_percent | I |
| Override AO3 | SNVT_lev_percent | I |
| Override DO1 | SNVT_switch | I |
| Override DO2 | SNVT_switch | I |
| Override DO3 | SNVT_switch | I |
| Override DO4 | SNVT_switch | I |
| Override DO5 | SNVT_switch | I |
| Override DO6 | SNVT_switch | I |
| Override DO7 | SNVT_switch | I |
| Override DO8 | SNVT_switch | I |
| Status AO1 | SNVT_lev_percent | O |
| Status AO2 | SNVT_lev_percent | O |
| Status AO3 | SNVT_lev_percent | O |
| Status DO1 | SNVT_switch | O |
| Status DO2 | SNVT_switch | O |
| Status DO3 | SNVT_switch | O |
| Status DO4 | SNVT_switch | O |
| Status DO5 | SNVT_switch | O |
| Status DO6 | SNVT_switch | O |
| Status DO7 | SNVT_switch | O |
| Status DO8 | SNVT_switch | O |
| PID1 Override | SNVT_lev_percent | I |
| PID2 Override | SNVT_lev_percent | I |
| PID3 Override | SNVT_lev_percent | I |
| PID4 Override | SNVT_lev_percent | I |
| Temperature nvi1 | SNVT_temp_p | I |
| Temperature nvi2 | SNVT_temp_p | I |
| Temperature nvi3 | SNVT_temp_p | I |
| Temperature nvi4 | SNVT_temp_p | I |
| Percent nvi1 | SNVT_lev_percent | I |
| Percent nvi2 | SNVT_lev_percent | I |
| PID Output 1 | SNVT_lev_percent | O |
| PID Output 2 | SNVT_lev_percent | O |
| PID Output 3 | SNVT_lev_percent | O |
| PID Output 4 | SNVT_lev_percent | O |
| Space temperature function output | SNVT_temp_p | O |
| Occ command 1 | SNVT_occupancy | I |
| Occ command 2 | SNVT_occupancy | I |
| Occ command 3 | SNVT_occupancy | I |
| Motor 1 | SNVT_lev_percent | O |
| Motor 2 | SNVT_lev_percent | O |
| Motor 3 | SNVT_lev_percent | O |
| Motor 4 | SNVT_lev_percent | O |

Such flexibility is further provided by designing the configurable controller 290 to be operable to use the following configuration properties:

| FUNCTION | ACCESS TYPE | Name |
|---|---|---|
| Temperature set point limits | UCPT | UCPT_TempStptxLim, x = 1-3 |
| Temperature set point offset | UCPT | UCPT_TempStptxOffset, x = 1-3 |
| Bypass time | UCPT | UCPT_BypassTimex, x = 1-3 |
| Space temperature function | UCPT | UCPT_SpcTmpFncCfg |
| Occupancy default | UCPT | UCPT_OccDefault |
| Bypass function | UCPT | UCPT_BypassFncCfg |
| Input filter time constraints | UCPT | UCPT_InFilTimeTZ (for physical input modules) |
| Network input fail value | UCPT | UCPT_NvFailValTZ |
| PID gains (proportional band) | UCPT | UCPT_PIDxCtrB, x = 1-4 |
| PID config (min/max/dband) | UCPT | UCPT_PIDxCfg, x = 1-4 |
| PID disable source | UCPT | UCPT_PIDxDisSrc, x = 1-4 |
| PID process variable source | UCPT | UCPT_PIDxPVSrc, x = 1-4 |
| PID set point source/config | UCPT | UCPT_PIDxSPSrc, x = 1-4 |
| Map configuration | UCPT | UCPT_Map1Cfg |
| Map source | UCPT | UCPT_Map1Src |
| Map input points | UCPT | UCPT_Map1BrkIn |
| Map output points | UCPT | UCPT_Map1BrkOut |
| Function configuration | UCPT | UCPT_Fnc1Cfg |
| Function source | UCPT | UCPT_Fnc1Src |
| Function constant | UCPT | UCPT_Fnc1ConstA |
| AO source | UCPT | UCPT_AOxSrc, x = 1-3 |
| AO input range | UCPT | UCPT_AOxInRange, x = 1-3 |
| AO output range | UCPT | UCPT_AOxOutRange, x = 1-3 |
| AO disable source | UCPT | UCPT_AOxDisSrc, x = 1-3 |
| DO configuration | UCPT | UCPT_DOxCfg, x = 1-8 |
| DO source | UCPT | UCPT_DOxSrc, x = 1-8 |
| DO disable source | UCPT | UCPT_DOxDisSrc, x = 1-8 |
| Motor source | UCPT | UCPT_MtrxSrc, x = 1-4 |
| Motor output range | UCPT | UCPT_MtrxOutLim, x = 1-4 |
| Motor travel time/Reverse | UCPT | UCPT_Mtrx, x = 1-4 |
| Motor disable source | UCPT | UCPT_MtrxDisSrc, x = 1-4 |

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

We claim:

1. A distributed automation system for controlling components in a heating ventilation and air conditioning system comprising:
   a controller with a plurality of data processing components including at least one constrained input proportional-integral-derivative component and at least one unconstrained input proportional-integral-derivative component, each of the plurality of data processing components having a first input and an output and operable to process data input to the data processing component,
      wherein the first input to the at least one constrained input proportional-integral-derivative component is configured to be limited to a process variable resulting from an actual temperature measurement, and
      wherein the at least one constrained input proportional-integral-derivative component further comprises a second input;
   a room temperature set point device having an output operably connected to the second input of the at least one constrained input proportional-integral-derivative component, the room temperature set point device operable to apply an offset to a temperature set point signal in response to a received signal and to output the offset temperature set point signal; and
   a user interface operable to operably connect the output of at least one of the plurality of data processing components to the first input of another of the plurality of data processing components.

2. A controller assembly comprising:
   a set of input modules configured to be coupled to receive signals from a select set of inputs from a building automation system;
   a set of output modules configured to be coupled to provide signals to a select set of outputs in a building automation system; and
   a set of process control modules comprising
      a first process control module operable to be configured in one of a first plurality of possible configurations, each possible configuration defining (i) a selectable connection between the set of input modules and the first process control module, and (ii) a selectable connection between the set of output modules and the first process control module, or a selectable connection with other process control modules in the set of process control modules, and
      a second process control module operable to be configured in one of a second plurality of possible configurations, each possible configuration defining (i) a selectable connection between the set of input modules and the second process control module, and (ii) a selectable connection between the set of output modules and the second process control module, or a selectable connection with other process control modules in the set of process control modules, wherein the possible configurations in the first plurality of possible configurations is a subset of the possible configurations in the second plurality of possible configurations.

3. The controller assembly of claim 2, wherein:
the first process control module is a proportional-integral-derivative module; and
the second process control module is a proportional-integral-derivative module.

4. The controller assembly of claim 3 wherein the first plurality of possible configurations and the second plurality of possible configurations includes at least one configuration wherein the first and the second process control module, respectively, is unused.

5. The controller assembly of claim 4 wherein the set of process control modules further includes at least one constrained input statistical function component.

6. The controller assembly of claim 4 wherein the set of process control modules further includes a bypass component.

7. The controller assembly of claim 2 wherein each process control module of the set of process control modules comprises a software routine executed by a processor.

8. The controller assembly of claim 2 further comprising a sequencer configured to process each of the set of inputs, each of the set of outputs, and each of the set of process control modules in a predetermined order.

9. A controller assembly comprising:
a housing;
a plurality of input terminals operably connected to a building automation system, the plurality of input terminals supported by said housing;
a plurality of output terminals operably connected to the building automation system, the plurality of output terminals supported by said housing;
a processing circuit supported by said housing, the processing circuit pre-programmed to perform at least four loop control functions, the processing circuit operably coupled to the plurality of input terminals and the plurality of output terminals; and
a memory operably coupled to the processing circuit and operably configured to store configuration information, the configuration information identifying logical input connections and logical output connections for each of the four loop control functions, the logical input connections and logical output connections for each of the four loop control functions selected from a set of allowed logical input connections and logical output connections for each of the four loop control functions, at least one of the four loop control functions having a set of allowed logical input connections and logical output connections that is a subset of the set of allowed logical input connections and logical output connections of another of the four loop control functions;
wherein the processing circuit operably provides at least one output value based on at least one input value received from at least one of the plurality of input terminals to at least one of the plurality of output terminals based on the stored configuration information.

10. The controller assembly of claim 9 wherein the processing circuit is further operable to perform a constrained input statistic function, and wherein the stored configuration information identifies logical input and output connections for the constrained input statistic function.

11. The controller assembly of claim 10 wherein the processing circuit is further operable to perform a bypass function, and wherein the stored configuration information identifies logical input and output connections for the bypass function.

12. The controller assembly of claim 9 wherein:
the four loop control functions comprise at least three proportional-integral-derivative loop control functions; and
at least one of the at least three proportional-integral-derivative loop control functions has a set of allowed logical input connections and logical output connections that is a subset of the set of allowed logical input connections and logical output connections of another of the at least three proportional-integral-derivative loop control functions.

13. The controller of claim 9 wherein:
the memory is field programmable:
the controller further comprises a read only memory; and
the at least four loop control functions are programmed in the read only memory.

14. A method of configuring an electrical controller in a network comprising the steps of:
providing a controller with a first and a second data processing component, each of the first and second data processing component having a first input and an output;
providing a set of allowed input connections and allowed output connections for the first data processing component;
providing a set of allowed input connections and allowed output connections for the second data processing component, the set of allowed input connections for the second data processing component a subset of the set of allowed input connections for the first data processing component;
providing a network management tool; and
configuring the controller with the network management tool at least by selecting an input connection and output connection for the first data processing component from the set of allowed input connections and allowed output connections for the first data processing component, or by selecting an input connection and output connection for the second data processing component from the set of allowed input connections and allowed output connections for the second data processing component.

15. The method of claim 14 wherein:
the step of providing a set of allowed input connections and allowed output connections for the first data processing component comprises the step of providing a set of allowed input connections that includes the output of the second data processing component; the step of providing a set of allowed input connections and allowed output connections for the second data processing component comprises the step of providing a set of allowed output connections that includes the input of the first data processing component; and
the step of configuring comprises the step of selecting the output of the second data processing component as the input for the first data processing component.

16. The method of claim 15 wherein the step of providing a controller with
a first and a second data processing component comprises the steps of:
providing a first proportional-integral-derivative component; and
providing a second proportional-integral-derivative component.

* * * * *